United States Patent [19]

Mitchell et al.

[11] 4,211,454
[45] Jul. 8, 1980

[54] ANTIFRICTION BEARING SUPPORT

[75] Inventors: William A. Mitchell; John S. Clark, both of Springfield, Vt.

[73] Assignee: Bryant Grinder Corporation, Springfield, Vt.

[21] Appl. No.: 952,028

[22] Filed: Oct. 16, 1978

[51] Int. Cl.² ............................................. F16C 27/08
[52] U.S. Cl. ........................................ 308/26; 308/28; 308/184 R
[58] Field of Search ................. 308/26, 28, 77, 184 R, 308/189 A, 207 A, DIG. 4; 184/6.26; 248/560; 277/88, 22

[56] References Cited

U.S. PATENT DOCUMENTS

| 2,840,350 | 6/1958 | Pierce | 277/22 |
| 2,867,123 | 1/1959 | Kmiecik | 277/88 |
| 3,113,809 | 12/1963 | Eggmann | 308/28 |
| 3,318,604 | 5/1967 | Tracy | 277/88 |
| 3,939,944 | 2/1976 | Mitchell et al. | 184/6.26 |

FOREIGN PATENT DOCUMENTS 306726 4/1955 Switzerland .
1001334 4/1955 United Kingdom .

Primary Examiner—Lenard A. Footland
Attorney, Agent, or Firm—Reising, Ethington, Barnard

[57] ABSTRACT

An antifriction bearing support (12) disclosed includes an outer support member (50) for mounting thereof on a spindle housing (16) and an inner support member (52) for mounting an antifriction bearing (42) which rotatably supports a spindle (38). The support also includes at least one flexible diaphragm (54) extending between the inner and outer support members to radially fix the inner support member and the antifriction bearing and preload the antifriction bearing axially with respect to the axis of spindle rotation so as to permit high speed spindle rotation. Preferably, a pair of the diaphragms (54) are utilized and are mounted in a spaced and parallel relationship to each other. Inner and outer round edges of the diaphragms are secured between axial surfaces (80, 82, 88, 90) of the support members and associated retaining ring (76, 78, 84, 86) that have soldered connections to the support members. Threading of the outer support member onto the housing flexes the diaphragms to provide the preloading of the antifriction bearing mounted by the diaphragm support. Another antifriction bearing (48) on the housing is also preloaded through the spindle by the diaphragms. A first end of the inner support member includes an opening (112) that receives the antifriction bearing (42) and a second end of the inner support member includes a heat exchanger (116) for removing heat. An oil-mist lubrication system feeds an oil-mist lubricant to the antifriction bearings and to the heat exchanger so as to increase the speed at which the spindle can be rotated.

18 Claims, 3 Drawing Figures

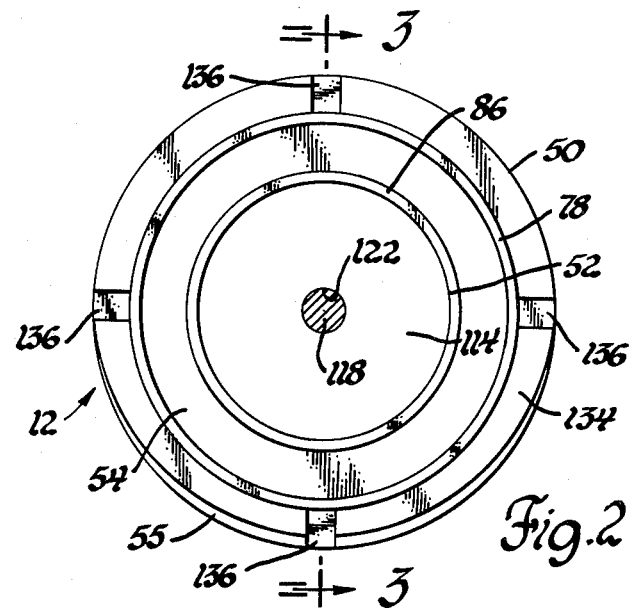
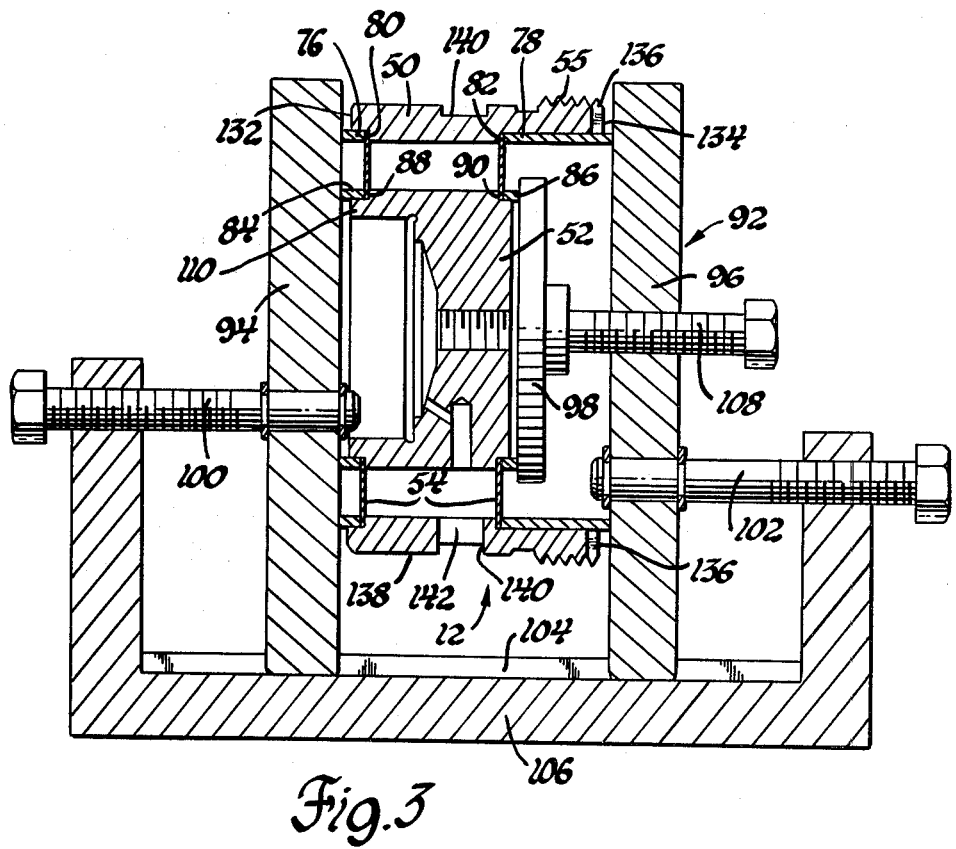

ANTIFRICTION BEARING SUPPORT

TECHNICAL FIELD

This invention relates to an antifriction bearing support for preloading an antifriction bearing in order to permit high speed rotation of a spindle supported by the bearing, and also relates to a spindle support assembly including the bearing support and an oil-mist lubrication system that cooperate to permit the high speed spindle rotation.

BACKGROUND ART

Antifriction bearings are conventionally utilized to support spindles for high speed rotation that is necessary with certain industrial machines as well as with other uses. For example, certain grinding wheelheads have spindles that support grinding wheels for grinding internal bores and the diameter of the grinding wheels thus cannot be varied to provide the requisite cutting speed for giving good surface finish. As such, only the rotation of the wheelhead spindle can be increased to provide higher cutting speeds at the interface of the grinding wheel and the workpiece. In certain instances, this spindle speed must be as great as about 150,000 revolutions per minute. In order to provide the high speed rotation, it is necessary to axially preload the spindle so that the ball elements of antifriction bearings which support the spindle will track in a true circle to prevent vibration that can cause heat and ultimate bearing failure.

Spring loaded ball slides are conventionally utilized to mount one of the antifriction bearings that support a high speed spindle and to axially preload the spindle through such bearing. These slides conventionally have an annular shape and one end which supports the outer race of the antifriction bearing. Balls which ride in axial grooves on the slide and in associated axial grooves in a support housing are utilized to radially position the slide. A spring biases the other end of the slide so as to axially bias the outer race of the antifriction bearing with respect to the inner race in order to provide the axial preloading that permits high speed spindle rotation. Axial preloading of the slide mounted bearing also axially biases the spindle so that an antifriction bearing which supports its other end is likewise preloaded to permit the high speed spindle rotation.

With ball slide mounted spindles, the machining of the slide and housing grooves that receive the balls for supporting the slide must be extremely precise so as to maintain the axis of spindle rotation in a fixed location. If the axis of spindle rotation is not maintained in a fixed location, the wobbling that takes place, even if very slight, can cause vibration that builds up heat and causes bearing failure. Thus, the spacing between the housing and slide grooves upon the initial machining cannot be too great or the radial location of spindle rotation will not be fixed and bearing failure will result. If there is an interference fit between the balls and the grooves, the biasing spring may not have a sufficient force to move the slide and thereby provide the preloading of the antifriction bearings that support the spindle. Even if the machining is precise so that there is no clearance and no interference between the balls and the grooves, heat which builds up during the high speed rotation can cause thermal expansion that deforms the balls and/or the grooves so as to result in a loose fit that allows wobbling of the axis of spindle rotation and the possibility of bearing failure.

Also, U.S. Pat. No. 3,939,944, which is assigned to the assignee of the present invention, discloses an oil-mist lubrication system for lubricating antifriction bearings with an oil-mist lubricant in order to prevent bearing failure.

DISCLOSURE OF INVENTION

One object of the present invention is to provide an improved support for mounting an antifriction bearing that rotatably supports a spindle about a fixed axis and for axially preloading the antifriction bearing in order to permit high speed spindle rotation.

Another object of the present invention is to provide a spindle support assembly which includes an improved antifriction bearing support and an oil-mist lubrication system for mounting a high speed spindle for rotation about a fixed axis and for preloading the spindle as well as lubricating and cooling the bearings to permit high speed rotation.

In carrying out the above objects and other objects of the invention, the antifriction bearing support includes an outer support member for mounting the support on a spindle housing and an inner support member for mounting an antifriction bearing which is used to rotatably support the spindle. At least one flexible diaphragm extends between the inner and outer support members in order to radially fix the inner support member and the antifriction bearing mounted on the inner support member. Flexing of the diaphragm as the outer support member is mounted on the housing preloads the antifriction bearing mounted on the inner support member in an axial direction with respect to the axis of spindle rotation so as to permit high speed spindle rotation.

Preferably, the antifriction bearing support includes a pair of the diaphragms which extend between the inner and outer support members in a spaced and parallel relationship to each other. Both the inner and outer support members have round shapes with the inner support member received within the outer support member. Threads are provided on the outer support member for threading onto threads of the spindle housing in order to provide flexing of the diaphragm that preloads the antifriction bearing mounted by the inner support member and preloading of the spindle supported thereby which in turn preloads another antifriction bearing that mounts an opposite end of the spindle. The flexible diaphragms are preferably made of a suitable metallic material such as steel and can be relatively thin for small bearings, i.e. a thickness of about three thousandths of an inch is sufficint for antifriction bearings that support a spindle end of a diameter equal to approximately three eighths of an inch. Of course, larger antifriction bearings will require thicker diaphragms in order to provide the requisite radial support and resistance to flexing so that an adequate axial preload can be generated.

Both the inner and outer support members include retainers that secure round inner and outer edges of the diaphragms. Each retainer is preferably embodied by a retaining ring and each support member has oppositely facing axial mounting surfaces that cooperate with the retaining rings to secure the diaphragms in a clamped relationship. The axial mounting surfaces on each support member are spaced from each other the same distance as the other support member so that the diaphragms are parallel to each other. Soldered connections secure the retaining rings to the support members to secure the diaphragms in their parallel relationship. Each retaining ring has an axial surface that is machined flush with a contiguous axial end surface of the associated support member.

In the preferred construction of the antifriction bearing support, the inner support member has a first end that includes a round mounting opening for receiving and mounting the outer race of the antifriction bearing that is mounted by the support and preloaded by the flexing of the diaphragms. A second end of the inner support member includes a heat exchanger which preferably has axially spaced fins of an annular shape. An intermediate outer surface of the inner support member extends between its first and second ends and a lubrication passage extends through the inner support member between the mounting opening thereof and the outer surface at a location between the diaphragms.

The preferred construction of the outer support member includes a first end adjacent the first end of the inner support member and a second end that receives the heat exchanger on the second end of the inner support member. Threads are provided on the second end of the outer support member so as to provide the threading of the bearing support to the spindle housing on which the antifriction bearing is mounted. An intermediate portion of the outer support member includes an annular outer groove and a hole that extends from the outer groove thereof to between the spaced diaphragms so as to provide a lubrication passage that is communicated with the lubrication passage of the inner support member by the spaced diaphragms.

An oil-mist lubrication system of the spindle support assembly of which the antifriction bearing support is a component includes lubrication passages for feeding an oil-mist lubricant to the antifriction bearings that support the spindle. The one antifriction bearing which is mounted by the diaphragm support is fed through the support member lubrication passages that are communicated by the spaced diaphragms. Also, a lubricant manifold fixed on the spindle housing receives the heat exchanger of the bearing support and is fed an oil-mist lubricant by a lubrication passage so as to remove heat from the bearing support.

The preferred construction of the manifold includes an end wall and an annular side wall extending axially from the end wall. Inlet and outlet ports of the manifold extend through the end wall and the outlet port has a larger size than the inlet port so as to facilitate the flow of the oil-mist lubricant through the manifold. The side wall of the manifold has axially extending grooves that communicate the ports with the fins of the heat exchanger.

The objects, features, and advantages of the present invention are readily apparent from the following description of the best mode for carrying out the invention when taken in connection with the accompanying drawings.

BRIEF DESCRIPTION OF DRAWINGS

FIG. 2 is an axial view taken along line 2—2 of FIG. 1 showing the antifriction bearing support; and FIG. 3 is a sectional view taken along line 3—3 of FIG. 2 with the addition of a fixture that shows the way in which diaphragms are positioned prior to heating within an oven to secure soldered connections of retaining rings that mount the diaphragms.

BEST MODE FOR CARRYING OUT THE INVENTION

Figure 1:
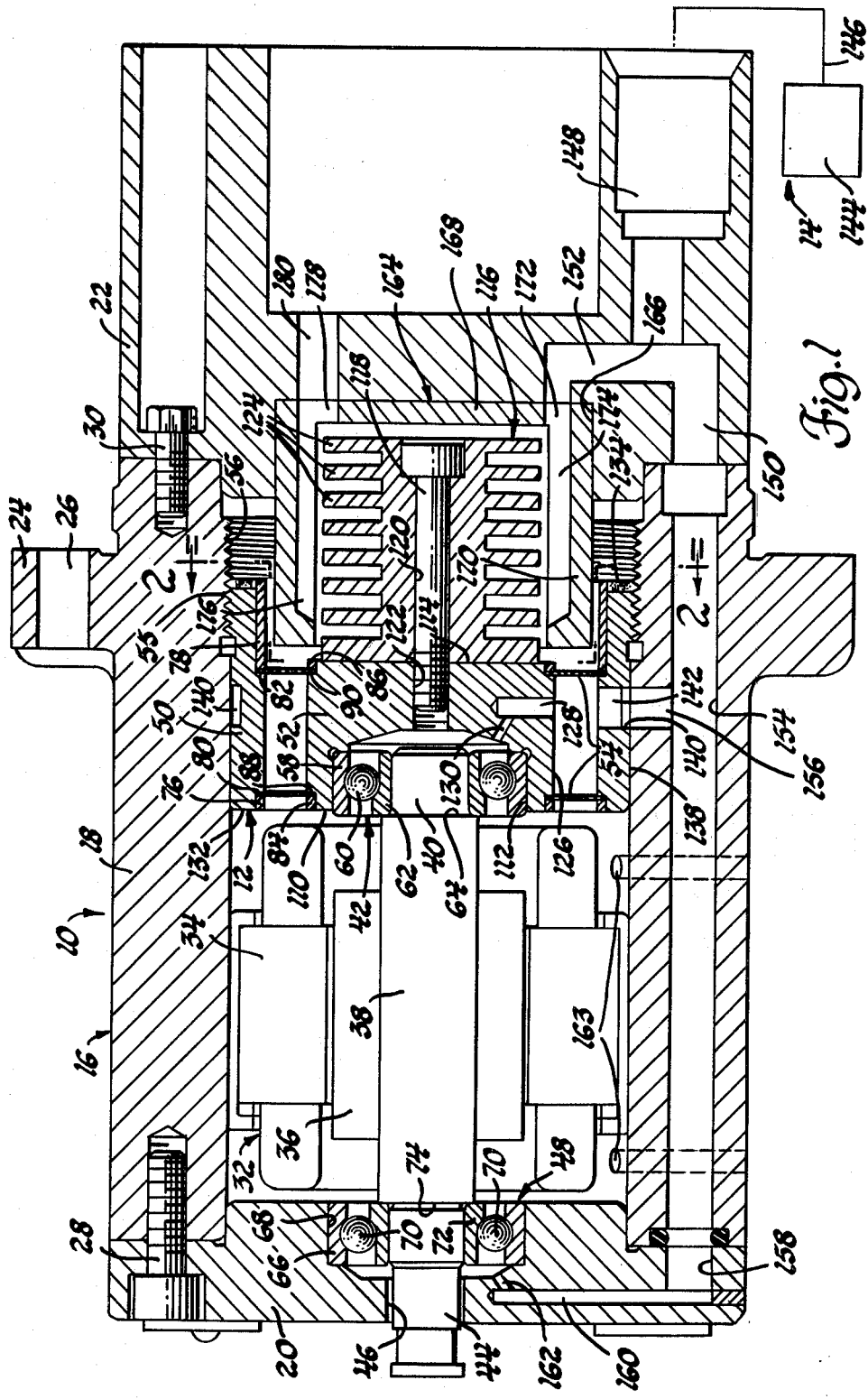
FIG. 1 is a sectional view taken through a spindle support assembly constructed according to the present invention and including an antifriction bearing support thereof as well as an oil-mist lubrication system for the assembly.

Referring to FIG. 1 of the drawings, a high speed spindle support assembly that is constructed in accordance with the present invention is embodied by a wheelhead 10 for supporting and rotationally driving a grinding wheel. Wheelhead 10 includes an antifriction bearing support 12 of the invention and an oil-mist lubrication system indicated generally by reference numeral 14 that cooperate to permit high speed driving of the grinding wheel in a manner which is hereinafter described.

A housing 16 of the wheelhead 10 is shown in FIG. 1 and includes a main housing portion 18, a first housing end portion 20, and a second housing end portion 22. Main housing portion 18 includes an annular mounting flange 24 having a number of circumferentially spaced bolt holes 26 (only one shown) for receiving mounting bolts that support the wheelhead on a suitable mount. First and second housing end portions 20 and 22 are respectively secured to opposite ends of the main housing portion 18 by sets of circumferentially spaced bolts 28 and 30, only one bolt of each set being shown. An electric motor 32 is received within the main housing portion 18 and includes a stator winding 34 mounted by the housing and a rotor winding 36 mounted on a rotatable shaft or spindle 38. One end 40 of the spindle 38 is supported by a first antifriction bearing 42 that is mounted by the bearing support 12 in a manner which is hereinafter described. The other end 44 of spindle 38 extends outwardly through an opening 46 in the housing end portion 20 to mount a grinding wheel and is supported by a second antifriction bearing 48.

As seen by combined reference to FIGS. 1 and 2, bearing support 12 includes an outer support member 50 of an annular shape that mounts the bearing support on the housing and a round inner support member 52 that is received within the outer support member and mounts the antifriction bearing 42 on which the spindle end 40 is supported. A pair of thin diaphragms 54 that are somewhat flexible are preferably made from a metallic material and extend from the outer support member 50 to the inner support member 52 in order to radially fix the location of the inner support member and the antifriction bearing 42 and thereby insure a fixed location of the axis of spindle rotation in order to prevent wobbling that could cause wear of the bearing. Outer support member 50 includes male threads 55 that are received by female threads 56 of the housing portion 18 in order to position the bearing support 12 on the housing.

As the outer support member 50 of bearing support 12 is threaded to the left as viewed in FIG. 1 onto the housing portion 18, the diaphragms 54 begin to flex as the support reaches the assembled position shown. Flexing of the diaphragms 54 preloads the outer race 58 of the bearing 42 in an axial direction toward the left so that the balls 60 of this bearing bias its inner race 62 toward the left. Preloading of the bearing 42 insures that the rolling contact between the balls 60 and the outer and inner races 58 and 62 will be at true circles during spindle rotation in order to permit high speed driving. It should be noted that the configuration of the outer race which axially captures the balls 60 against movement in both directions and the configuration of the inner race 62 that prevents movement of the balls to the left with respect to the inner race permits the preloading of the bearing in the manner described. Inner race 62 of bearing 42 is axially seated against a shoulder 64 of the spindle 38 so that the spindle is also axially preloaded toward the left. At its end 44, the spindle 38 is supported by the antifriction bearing 48 whose outer race 66 is pressed into a round opening 68 in the housing end portion 20. Balls 70 of bearing 48 support its inner race 72 on the outer race and a shoulder 74 of spindle 38 is axially seated against the right end of the inner race 72. Preloading of the spindle 38 toward the left by the diaphragms of bearing support 12 axially preloads the inner race 72 of bearing 48 toward the left so that the balls 70 apply a preloading force to the fixed inner race 66 of this bearing. As with the other bearing 42, the configurations of the outer and inner races 66 and 72 of bearing 48 allow the axial preloading force to act through the balls 70 in order to provide true circular rolling engagement as the spindle is rotated for high speed driving.

As seen in FIG. 1, diaphragm retainers of the outer support member 50 are preferably comprised by a pair of retaining rings 76 and 78 that cooperate with a pair of axial mounting surfaces 80 and 82 to secure the round outer edges of the diaphragms 54. Soldered connections of the retaining rings 76 and 78 to the outer support member 50 secure the rings in position.

Retainers of the inner support member 52 shown in FIG. 1 also comprise a pair of retaining rings 84 and 86. Inner support member 52 has axial mounting surfaces 88 and 90 that face in opposite directions from each other and cooperate with the retaining rings 84 and 86 to secure the round inner edges of the diaphragms 54. Soldered connections secure the retaining rings 84 and 86 to the inner support member 52. Mounting surfaces 88 and 90 on inner support member 52 are spaced axially from each other the same distance as the mounting surfaces 80 and 82 on the outer support member 50. As such, the spaced diaphragms 54 extend in a parallel relationship to each other.

The soldered connections of the retaining rings 76, 78, 84, and 86 to the outer and inner support members 50 and 52 are preferably made by first painting a silver solder paste of a low melting temperature onto the rings and/or the support members. A fixture like the fixture 92 shown in FIG. 3 is then utilized to position the retaining rings with the diaphragms 54 secured in position between the retaining rings and the mounting surfaces of the support members. It will be noted that each of the retaining rings 76, 78, 84, and 86 initially has a greater axial length, as shown in FIG. 3, than the completed bearing support. As such, each of the retaining rings initially extends axially from the associated support member 50 or 52 so that the clamp members 94, 96, and 98 of fixture 92 can engage the retaining rings in order to provide clamping pressure that secures the diaphragms 54 before the painted solder paste is heated to secure the connections. Screws 100 and 102 support the clamp members 94 and 96 on a slideway 104 of a fixture base 106 in order to provide the clamping of the diaphragms by retaining rings 76, 78, and 84. Another screw 108 supports the clamp member 98 for movement on the clamp member 96 in order to provide clamping of the right diaphragm 54 by the retaining ring 86. After the fixture 92 is placed in the oven and heated to make the soldered connections, the fixture is removed so that the screws 100, 102 and 108 can be unthreaded to release the assembled bearing support 12. Subsequently, the retaining rings 76, 78, 84, and 86 are machined to reduce their axial lengths and to thereby provide machined axial surfaces that are flush with contiguous axial end surfaces of the support members 50 and 52.

As seen in FIG. 1, a first end 110 of the inner support member 52 has an axial surface that is flush with the associated diaphragm retaining ring 84 and also includes a bearing mounting opening 112 that has a round shape of a size which receives the outer bearing race 58 by a press fit. A second end 114 of the inner support member 52 has a surface that is flush with the associated diaphragm retaining ring 86 and includes a heat exchanger 116 that is secured by a bolt 118 which extends through a hole 120 in the heat exchanger into a threaded hole 122 in the support member. Fins 124 of heat exchanger 116 are spaced axially therealong and preferably have an annular shape for transferring heat from the inner support member 52 in a manner which is hereinafter described. Between its first and second ends 110 and 114, the inner support member 52 includes an intermediate outer surface 126 of a round shape located between the diaphragms 54. A radial hole 128 and an axially inclined port 130 in the inner support member 52 extend from its intermediate outer surface 126 at a location between the diaphragms 54 to the bearing mounting openings 112 in order to provide a lubrication passage for the oil-mist lubrication system.

As seen by continuing reference to FIG. 1, the outer support member 50 includes a first end 132 with a surface that is flush with the associated diaphragm retaining ring 76 located adjacent the first end 110 of the inner support member 52. Outer support member 50 has a greater axial length that the inner support member 52 and includes a second end 134 which receives the left end of the heat exchanger 116. Radial slots 136 (see also FIG. 2) in the second end 134 of the outer support member are provided for threading of the bearing support onto the housing 18 to the assembled position shown in FIG. 1. Retaining ring 78 is machined flush with a contiguous axial surface of the support member end 134. The male threads 55 of the outer support member 50 are located at its second end 134. An intermediate portion 138 of outer support member 50 includes an annular outer groove 140 and a radial hole 142 that cooperate to provide a lubrication passage into the space between the diaphragms 54 for communication with the lubrication passage provided by the hole 128 and port 130 in the inner support member 52. An oil-mist lubricant from the oil-mist lubrication system is thus provided through these passages to the antifriction bearing 42 in a manner which is hereinafter described.

The oil-mist lubrication system 14 shown in FIG. 1 preferably includes an oil-mist supply unit and a blender distributor unit both of which are schematically indicated by 144 and preferably constructed as disclosed and claimed by U.S. Pat. No. 3,939,944, the disclosure of which is hereby incorporated by reference. A conduit 146 feeds an oil-moist lubricant supplied by the units 144 to an inlet lubrication passage 148 in the spindle housing end portion 22. Lubrication passage 148 feeds the oil-mist lubricant through the housing end portion 22 to a bearing lubrication passage 150 and a heat exchanger lubrication passage 152. From passage 150, the oil-mist lubricant is fed through an axial passage 154 in the main housing portion 18 and to a passage 156 that feeds the lubrication passage provided by the groove 140 and the hole 142 in the outer support member 50 of the bearing support 12. Oil-mist lubricant is thus fed between the diaphragms 54 through the lubrication passage provided by the hole 128 and the port 130 in the inner support member 52 of bearing support 12 to the antifriction bearing 42 in order to provide lubrication and removal of heat. It will be noted that the annular shape of the groove 140 and the cooperable radial hole 142 in the outer support member 50 allow communication of the passage 156 to the space between the diaphragms 54 regardless of the rotational position of the bearing support. Thus, no matter what position the bearing support 12 has to be rotated to in order to provide the required preloading force on the spindle 38, the oil-mist lubricant will be fed to the bearing 42 due to the groove and hole construction provided. Oil-mist lubricant is also fed from passage 154 to a passage 158 in the housing end portion 20 and through a lubrication passage provided by a hole 160 and a port 162 to the other antifriction bearing 48. Both of the antifriction bearings 42 and 48 thus receive the oil-mist lubricant in order to provide bearing lubrication and the removal of heat during high speed rotation. Ports 163 in the housing portion 18 allow the oil-mist lubricant to escape from the interior of wheelhead 10.

Lubrication system 14 also includes a cup-shaped lubricant manifold 164 that is mounted by the housing portion 22 within an opening 166 by a heat shrink process. Manifold 164 includes an end wall 168 that has a round shape when viewed in an axial direction and also includes an annular side wall 170 that extends from the end wall 168 toward the left. An inlet port 172 through the manifold end wall 168 receives the oil-mist lubricant from the lubrication passage 152 and feeds the oil-mist lubricant to an axially extending groove 174 in the side wall for flow about the annular fins 124 of heat exchanger 116 in order to receive heat from the inner support member 52 of the bearing support. Another axially extending groove 176 in the manifold side wall 170 feeds the oil-mist lubricant after it has passed around the fins 124 to an outlet port 178 through the manifold end wall 168 and through an exit lubrication passage 180. Outlet port 178 of the manifold preferably has a greater size than the inlet port 172 so as to not to inhibit the flow of the oil-mist lubricant past the heat exchanger 116.

In the preferred embodiment disclosed, the diaphragms 54 are relatively thin, only on the order of about three thousandths of an inch thick, but nevertheless provide sufficient radial support for the antifriction bearing 42 and sufficient resistance to flexing to provide the required axial preloading force. Best results are achieved when two diaphragms are utilized if, as previously mentioned, the axial mounting surfaces 80 and 82 on the outer support member 50 are spaced from each other the same distance as the axial mounting surfaces 88 and 90 on the inner member 52. if such a spaced relationship is provided, the diaphragms 54 are maintained in a spaced and parallel relationship to each other so as to insure positioning of the inner support member 52 along a straight line and consequent fixed rotation of the spindle 38 about the same axis regardless of the degree of threading to vary the preloading force. Bearing 42 has an inner race 62 in the embodiment disclosed which receives a spindle end 40 of a diameter equal to about three-eighths of an inch. Threading of the outer support member 50 onto the housing portion 18 with a bearing of such a size requires an axial preloading force of somewhere between about 10 and 15 pounds in order to provide high speed rotation which can be as high as about 150,000 revolutions per minute. Of course, different size antifriction bearings will require different preloading forces and diaphragms of different thicknesses to give the required radial support and resistance to flexing for providing the preloading.

While the best mode for practicing the invention has herein been described in detail, those familiar with the art to which this invention relates will recognize various alternative designs and embodiments for practicing the present invention as defined by the following claims.

What is claimed is:

1. An antifriction bearing support comprising: an outer support member for mounting the support on a spindle housing; an inner support member for mounting an antifriction bearing which is adapted to rotatably support a spindle; at least one diaphragm that extends between the inner and outer support members in order to radially fix the inner support member and the antifriction bearing mounted thereby; said diaphragm being flexible to allow preloading of the antifriction bearing axially with respect to the axis of spindle rotation such that the preloading permits high speed spindle rotation; and adjustable means for mounting the outer support member on the spindle housing to flex the diaphragm and axially preload the antifriction bearing in an adjustable manner.

2. An antifriction bearing support comprising: an outer support member for mounting the support on a spindle housing; an inner support member for mounting an antifriction bearing which is adapted to rotatably support a spindle; a pair of spaced diaphragms that extend between the inner and outer support members in order to radially fix the inner support member and the antifriction bearing mounted thereby; said pair of spaced diaphragms being flexible to allow preloading of the antifriction bearing axially with respect to the axis of spindle rotation such that the preloading permits high speed spindle rotation; and adjustable means for mounting the outer support member on the spindle housing to flex the pair of spaced diaphragms and axially preload the antifriction bearing in an adjustable manner.

3. An antifriction bearing support comprising: an annular outer support member for mounting the support on a spindle housing; a round inner support member for mounting an antifriction bearing which is adapted to rotatably support a spindle; a pair of metallic diaphragms that have annular shapes and extend between the inner and outer support members in a spaced and parallel relationship to each other in order to radially fix the inner support member and the antifriction bearing mounted thereby; said pair of diaphragms being flexible to allow preloading of the antifriction bearing axially with respect to the axis of spindle rotation by threading of the outer support member onto the housing such that the preloading permits high speed spindle rotation; and adjustable means including threads on the outer support member for mounting thereof on the spindle housing to flex the diaphragms and axially preload the antifriction bearing in an adjustable manner.

4. A support as in claim 3 wherein the inner and outer support members each include a pair of retainers that respectively secure the diaphragms to the support members.

5. A support as in claim 4 wherein each retainer comprises a retaining ring, said inner and outer support members each having oppositely facing axial mounting surfaces that respectively oppose the retaining rings associated therewith, and each diaphragm having inner and outer round edges that are secured between the retaining rings and the mounting surfaces of the inner and outer support members.

6. A support as in claim 5 wherein each retaining ring has a soldered connection to the associated support member.

7. A support as in claim 6 wherein each retaining ring has an axial surface that is machined flush with a contiguous axial end surface of the associated support member.

8. A support as in claims 3, 5, or 7 wherein the inner support member has a first end including a round mounting opening for receiving and mounting an outer race of the antifriction bearing that is adapted to be mounted by the support.

9. A support as in claim 8 wherein the inner support member has a second end including a heat exchanger.

10. A support as is claim 9 wherein the heat exchanger includes a plurality of annular fins spaced axially along the axis of spindle rotation.

11. A support as in claim 9 wherein the inner support member includes a lubrication passage and has an intermediate outer surface located between its first and second ends, and said lubrication passage extending between the mounting opening of the inner support member and the outer surface thereof at a location between the diaphragms.

12. A support as in claim 11 wherein the outer support member includes:
a first end adjacent the first end of the inner support member;
a second end that receives the heat exchanger on the second end of the inner support member and defines the threads thereof for mounting the support and preloading the antifriction bearing that is adapted to be mounted by the inner support member; and
an intermediate portion including an annular outer groove and a hole providing a lubrication passage extending from the outer groove thereof to between the spaced diaphragms so as to communicate with the lubrication passage of the inner support member.

13. An antifriction bearing support comprising: an annular outer support member for mounting the support on a spindle housing; a round inner support member that is received within the outer support member and has an opening for mounting an antifriction bearing which is adapted to rotatably support a spindle; each of said support members having a pair of axial mounting surfaces that face in opposite directions along the direction of spindle rotation; said mounting surfaces on each support member being spaced from each other the same distance as the mounting surfaces on the other support member; a pair of metallic diaphragms which have annular shapes defining round inner and outer edges that respectively engage the axial mounting surfaces of the support members such that the diaphragms are spaced in a parallel relationship to each other; retaining rings that cooperate with the axial mounting surfaces of the support members to secure the diaphragms thereto and radially fix the inner support member and the antifriction bearing mounted thereby; said pair of diaphragms being flexible to allow preloading of the antifriction bearing axially with respect to the axis of spindle rotation to permit high speed spindle rotation; and adjustable means including threads on the outer support member for mounting thereof on the spindle housing to flex the diaphragms and axially preload the antifriction bearing in an adjustable manner.

14. An antifriction bearing support comprising: an annular outer support member having threads for mounting thereof on a spindle housing; a round inner support member that is received within the outer support member and has a first end including an opening for mounting an antifriction bearing which is adapted to rotatably support a spindle; said inner support member also having a second end that includes a heat exchanger and an intermediate outer surface extending between the first and second ends thereof; a lubrication passage extending through the inner support member between the bearing mounting opening and intermediate outer surface thereof; each of said support members having a pair of axial mounting surfaces that face in opposite directions along the direction of spindle rotation; said mounting surfaces on each support member being spaced from each other the same distance as the mounting surfaces on the other support member; a pair of metallic diaphragms which have annular shapes defining round inner and outer edges that respectively engage the axial mounting surfaces of the support members such that the diaphragms are spaced in a parallel relationship to each other; and retaining rings that have soldered connections to the inner and outer support members and cooperate with the axial mounting surfaces of the support members to secure the diaphragms thereto and thereby fixedly locate the inner support member and the antifriction bearing mounted thereby, said pair of diaphragms being flexible to allow preloading of the antifriction bearing axially with respect to the axis of spindle rotation by threading of the outer support member onto the spindle housing such that the preloading permits high speed spindle rotation.

15. A high speed spindle support assembly comprising: a threaded housing; a rotatable spindle; first and second antifriction bearings for supporting the spindle on the housing; a support for one of the antifriction bearings including outer and inner support members; said outer support member having an annular shape and threads for threading thereof onto the housing; said inner support member being received within the outer support member and including a first end having an opening for mounting said one antifriction bearing and a second end including a heat exchanger as well as an intermediate outer surface that extends between the first and second ends thereof; a lubrication passage extending through the inner support member to the opening thereof in which said one antifriction bearing is mounted; said support also including a metallic diaphragm of an annular shape that extends between the inner and outer support members in order to radially fix the inner support member and said one antifriction bearing mounted thereby; said diaphragm being flexible to provide preloading of the antifriction bearings axially with respect to the axis of spindle rotation upon threading of the outer support member to the housing such that the preloading permits high speed spindle rotation; lubrication passages that communicate with the other antifriction bearing and the heat exchanger; and an oil-mist lubrication system for supplying an oil-mist lubricant to said lubrication passages in order to lubricate said bearings and receive heat from the heat exchanger.

16. A high speed spindle support assembly comprising: a threaded housing; a rotatable spindle; first and second antifriction bearings for supporting the spindle on the housing; a support for one of the bearings including outer and inner support members; said outer support member having an annular shape and threads for threading thereof onto the housing; said inner support member being received within the outer support member and including a first end having an opening for mounting said one antifriction bearing and a second end including a heat exchanger; a lubrication passage extending through the inner support member to the opening thereof in which said one antifriction bearing is mounted; said support also including a pair of metallic diaphragms of annular shapes that extend between the inner and outer support members in a spaced relationship to each other in order to radially fix the inner support member and said one antifricion bearing; said pair of diaphragms being flexible to provide preloading of the antifriction bearings axially with respect to the axis of spindle rotation upon threading of the outer support member to the housing such that the preloading permits high speed spindle rotation; lubrication passages that communicate with the other bearing and the heat exchanger; and an oil-mist lubrication system for supplying an oil-mist lubricant to said lubrication passages in order to lubricate the antifriction bearings and receive heat from the heat exchanger.

17. A high speed spindle support assembly comprising: a threaded housing; a rotatable spindle; first and second antifriction bearings for supporting the spindle on the housing; a support for one of the bearings including outer and inner support members; said outer support member having an annular shape and threads for threading thereof onto the housing; the outer support member having first and second axial ends and an intermediate portion including a lubrication passage extending between the interior and exterior thereof; said inner support member being received within the outer support member and including a first end having an opening for mounting said one bearing and a second end including a heat exchanger as well as an intermediate outer surface that extends between the first and second ends thereof; a lubrication passage extending through the inner support member between the opening and intermediate outer surface thereof; said heat exchanger having annular fins; said support also including a pair of metallic diaphragms of annular shapes that extend between the inner and outer support members in a spaced and parallel relationship to each other in order to radially fix the inner support member and said one antifriction bearing; said pair of diaphragms being flexible to provide preloading of the antifriction bearings axially with respect to the axis of spindle rotation upon threading of the outer support member to the housing such that the preloading permits high speed spindle rotation; the lubrication passages of the inner and outer support members being communicated with each other by the spaced diaphragms; a lubrication passage that communicates with the other antifriction bearing; a cup-shaped lubricant manifold mounted by the housing with the heat exchanger received therein; said lubricant manifold having inlet and outlet ports to the interior thereof where the heat exchanger is located; a lubrication passage communicated with the inlet port of the lubricant manifold; and an oil-mist lubrication system for supplying an oil-mist lubricant to said lubrication passages in order to lubricate said bearings and receive heat from the heat exchanger.

18. An assembly as in claim 17 wherein the lubricant manifold includes an end wall and an annular side wall extending axially from the end wall, the inlet and outlet ports of the manifold extending through the end wall thereof and the outlet port having a larger size than the inlet port to facilitate flow of the oilmist lubricant therethrough, and the side wall of the manifold having axially extending grooves communicating the ports thereof with the fins of the heat exchanger.

* * * * *